(12) United States Patent
Iguchi et al.

(10) Patent No.: US 11,443,896 B2
(45) Date of Patent: Sep. 13, 2022

(54) ELECTRONIC COMPONENT

(71) Applicant: TDK CORPORATION, Tokyo (JP)

(72) Inventors: Toshihiro Iguchi, Tokyo (JP); Norihisa Ando, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/373,672

(22) Filed: Jul. 12, 2021

(65) Prior Publication Data
US 2022/0020533 A1  Jan. 20, 2022

(30) Foreign Application Priority Data

Jul. 16, 2020 (JP) .............................. JP2020-122151

(51) Int. Cl.
| | |
|---|---|
| *H01G 4/232* | (2006.01) |
| *H01G 2/06* | (2006.01) |
| *H01G 4/30* | (2006.01) |
| *H01G 4/12* | (2006.01) |

(52) U.S. Cl.
CPC ............ *H01G 4/232* (2013.01); *H01G 2/065* (2013.01); *H01G 4/2325* (2013.01); *H01G 4/30* (2013.01); *H01G 4/12* (2013.01)

(58) Field of Classification Search
CPC .......... H01G 4/30; H01G 4/228; H01G 4/232; H01G 2/10
See application file for complete search history.

(56) References Cited

U.S. PATENT DOCUMENTS

| | | | |
|---|---|---|---|
| 2008/0174931 A1* | 7/2008 | Skamser | H01G 4/30 361/306.1 |
| 2010/0123995 A1* | 5/2010 | Otsuka | H01G 4/228 361/308.1 |
| 2016/0071650 A1* | 3/2016 | McConnell | B23K 1/0053 29/25.42 |
| 2017/0287645 A1* | 10/2017 | Masuda | H01G 4/248 |
| 2018/0374639 A1* | 12/2018 | Akiyoshi | H01G 4/12 |
| 2019/0164694 A1* | 5/2019 | Ando | H01G 4/12 |

FOREIGN PATENT DOCUMENTS

| | | | | |
|---|---|---|---|---|
| JP | 2000306764 A | * | 11/2000 | ............... H01G 4/12 |
| JP | 2002-057064 A | | 2/2002 | |

* cited by examiner

Primary Examiner — Eric W Thomas
(74) Attorney, Agent, or Firm — Oliff PLC

(57) ABSTRACT

An electronic component includes an element body, a pair of external electrodes respectively disposed at both ends of the element body in a first direction, and a pair of metal terminals respectively connected to the pair of external electrodes with solder. Each metal terminal includes a connection opposing the corresponding external electrode in the first direction and formed with a plurality of grooves and includes a leg extending from the connection. The connection includes a pair of end edges separated from each other in a third direction intersecting with a second direction where the leg extends from the connection. The grooves extend in a direction different from the second direction and intersecting with the third direction so that the grooves are separated from one of the pair of end edges. A surface included in the connection and defining each of the grooves is in contact with the solder.

8 Claims, 7 Drawing Sheets

ELECTRONIC COMPONENT

BACKGROUND OF THE INVENTION

Field of the Invention

An aspect of the present invention relates to an electronic component.

Description of Related Art

Known electronic components include an element body, an external electrode disposed at an end of the element body, and a metal terminal connected to the external electrode with solder (see, for example, Japanese Unexamined Patent Publication No. 2002-57064).

SUMMARY OF THE INVENTION

An external electrode is connected to a metal terminal with solder. In order to enhance connection strength between an external electrode and a metal terminal, the electronic component disclosed in Japanese Unexamined Patent Publication No. 2002-57064 includes a metal terminal in which a recess is formed to increase a contact area between the external electrode and the metal terminal. However, strength of the metal terminal may decrease with a shape of the recess.

An object of each aspect of the present invention is to provide an electronic component that enhances the connection strength between an external electrode and a metal terminal and prevents the metal terminal from decreasing in strength.

An electronic component according to one aspect includes an element body, a pair of external electrodes respectively disposed at both ends of the element body in a first direction, and a pair of metal terminals respectively connected to the pair of external electrodes with solder. Each metal terminal includes a connection opposing the corresponding external electrode in the first direction and formed with a plurality of grooves and includes a leg extending from the connection. The connection includes a pair of end edges separated from each other in a third direction intersecting with a second direction in which the leg extends from the connection. The plurality of grooves extends in a direction different from the second direction and intersecting with the third direction in such a manner that the grooves are separated from any one of the pair of end edges. A surface included in the connection and defining each of the grooves is in contact with the solder.

According to the one aspect, a configuration in which the plurality of grooves is formed in the connection and the surface defining each groove is in contact with the solder increases a contact area between the solder and the connection. A configuration in which the grooves extend in a direction different from the second direction prevents from drooping along the grooves as compared with a configuration in which the grooves extend in the second direction, when the external electrode and the metal terminal are connected with the solder. The one aspect enhances connection strength between the external electrode and the metal terminal A configuration in which the plurality of grooves formed is separated from one of the pair of end edges separated from each other in the third direction does not couple the pair of end edges via the grooves. The extending direction of the grooves intersects with the third direction. The one aspect prevents the metal terminal from decreasing in strength.

In the one aspect, at least one of the plurality of grooves may reach one end edge of the pair of end edges and may be separated from another end edge. In a configuration in which at least one of grooves reaches one end edge and is separated from another end edge, at least one of the grooves extends to the one end edge, and a contact area is increased between the solder and the connection at the one end edge. The at least one of the grooves is separated from the other end edge, and a decrease in strength is prevented in the metal terminal.

In the one aspect, at least another of the plurality of grooves may be separated from the one end edge and may reach the other end edge.

In a configuration in which at least another of the grooves is separated from the one end edge and reach the other end edge, the at least other of the grooves extends to the other end edge, and a contact area is increased between the solder and the connection at the other end edge. The at least other of the grooves is separated from the one end edge, and a decreasing in strength is prevented in the metal terminal.

In the one aspect, the plurality of grooves formed in the connection of one metal terminal of the pair of metal terminals may extend in a direction intersecting with a direction in which the plurality of grooves formed in the connection of another metal terminal of the pair of metal terminals extends when viewed in the first direction. In a configuration in which the plurality of grooves formed in the connection of one metal terminal extends in the direction intersecting with the direction in which the plurality of grooves formed in the connection of the other metal terminal extends, the pair of metal terminals tends not to bend when an external force is applied to the pair of metal terminals. The configuration reliably prevents the metal terminal from decreasing in strength.

In the one aspect, the plurality of grooves may not be formed in the leg. In a configuration in which the plurality of grooves is not formed in the leg, the leg tends not to decrease in strength. The configuration even more reliably prevents the metal terminal from decreasing in strength.

In the one aspect, the metal terminal may include a plated layer constituting an outermost layer of the connection, and the plated layer may include a Ni layer and a Sn layer disposed on the Ni layer. In a configuration in which the metal terminal includes the plated layer constituting the outermost layer of the connection and includes the Ni layer and the Sn layer, the configuration further increases connection strength between the solder and the connection.

In the one aspect, an outer surface of the plated layer may include the surface defining each groove. In a configuration in which the outer surface of the plated layer includes the surface defining each groove, the configuration increases connection strength between the solder and the surface defining each groove.

An electronic component according to another aspect includes an element body, an external electrode disposed at an end of the element body in a first direction, and a metal terminal connected to the external electrode with solder. The metal terminal includes a connection opposing the external electrode in the first direction and formed with a plurality of grooves and includes a leg extending from the connection. The connection includes a pair of end edges separated from each other in a third direction intersecting with a second direction in which the leg extends from the connection. The plurality of grooves extends in a direction different from the second direction and intersecting with the third direction in such a manner that the grooves are separated from one of the pair of end edges. A surface included in the connection and defining each of the grooves is in contact with the solder.

According to the other aspect, a configuration in which the plurality of grooves is formed in the connection and the surface defining each groove is in contact with the solder increases a contact area between the solder and the connection. The groove shape increases a contact area between the solder and the connection as compared with, for example, a protruding shape. A configuration in which the grooves extend in a direction different from the second direction prevents from drooping along the grooves as compared with a configuration in which the grooves extend in the second direction, when the external electrode and the metal terminal are connected with the solder. The other one aspect enhances connection strength between the external electrode and the metal terminal. A configuration in which the plurality of grooves formed is separated from one of the pair of end edges separated from each other in the third direction does not couple the pair of end edges via the grooves. The extending direction of the grooves intersects with the third direction. The other aspect prevents the metal terminal from decreasing in strength.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

DETAILED DESCRIPTION OF EMBODIMENTS

Hereinafter, embodiments of the present invention will be described in detail with reference to the accompanying drawings. In the following description, the same elements or elements having the same functions are denoted with the same reference numerals and overlapped explanation is omitted.

First Embodiment

Figure 1:
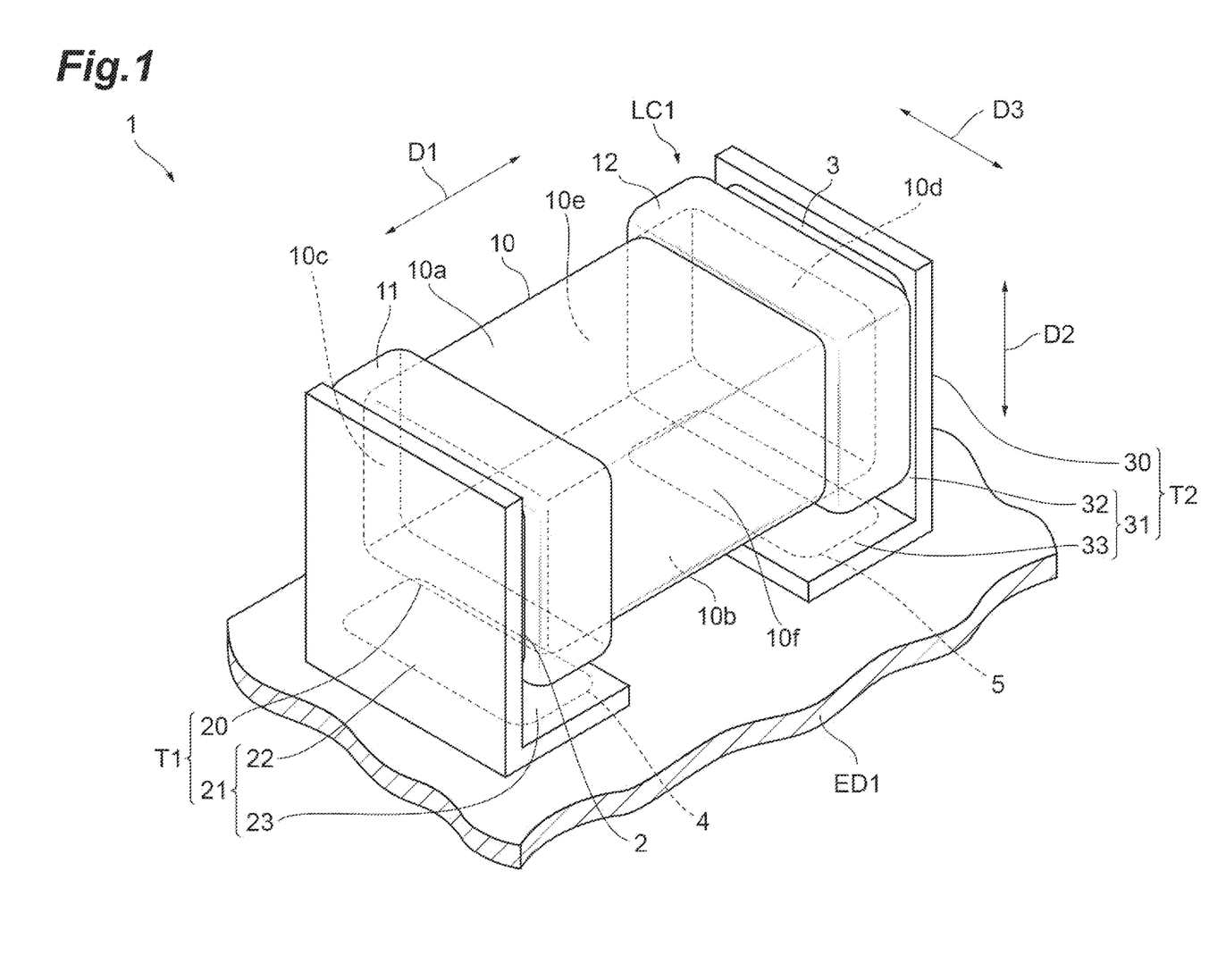
FIG. 1 is a perspective view of an electronic component according to a first embodiment.
Figure 2:
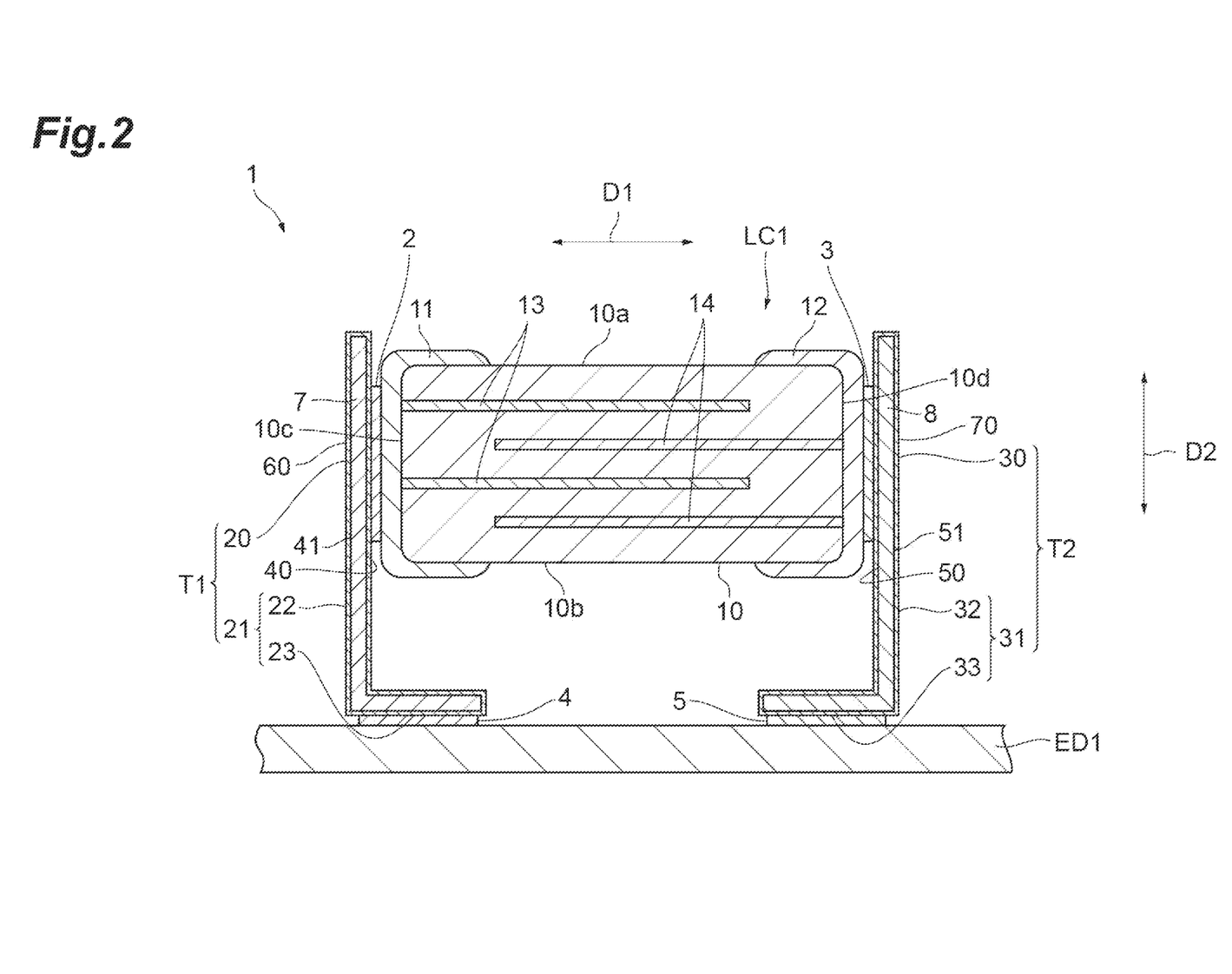
FIG. 2 is a view illustrating a cross-sectional configuration of the electronic component according to the first embodiment.
Figure 3:
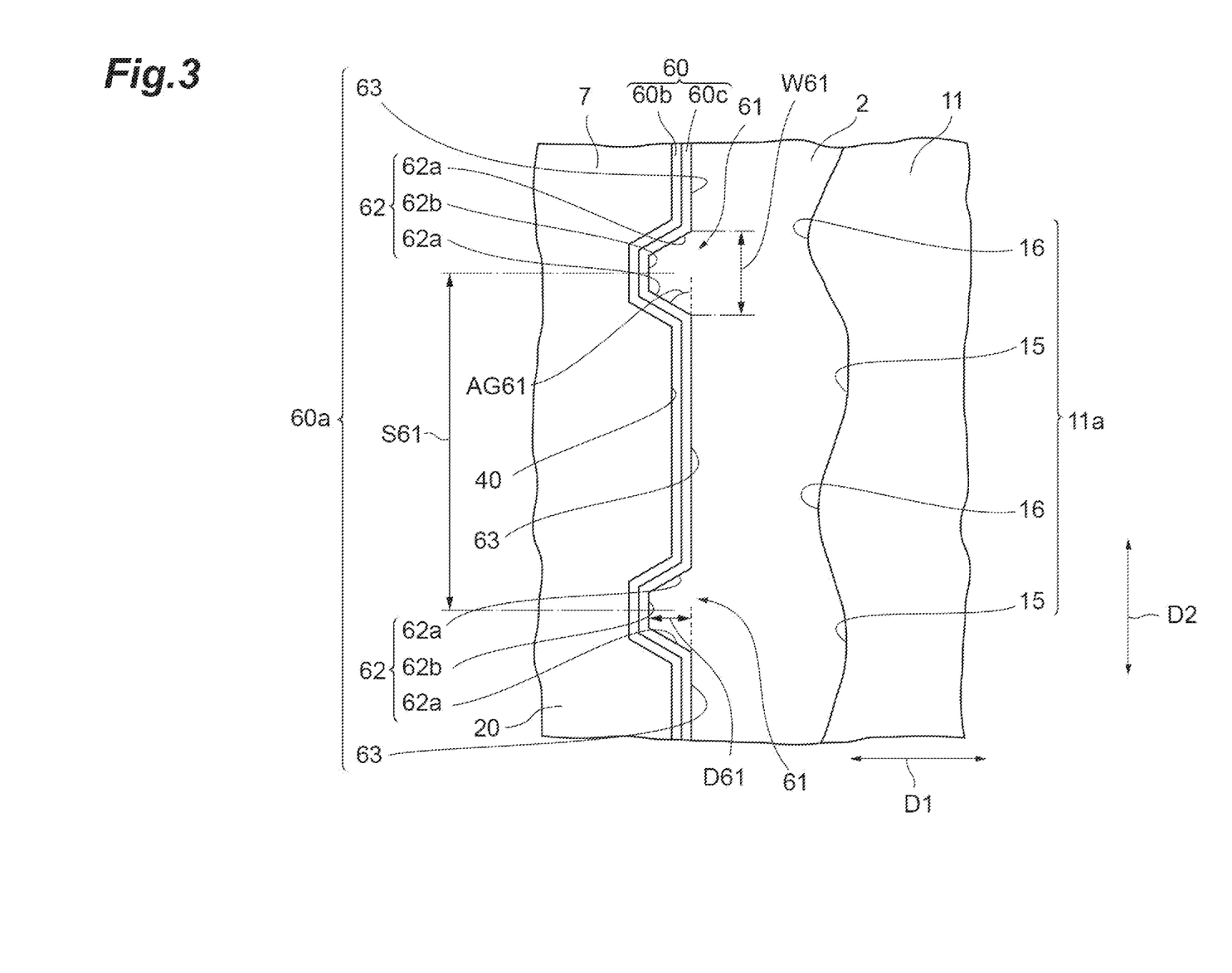
FIG. 3 is a view illustrating a cross-sectional configuration of a metal terminal, solder, and an external electrode according to the first embodiment.
Figure 4:
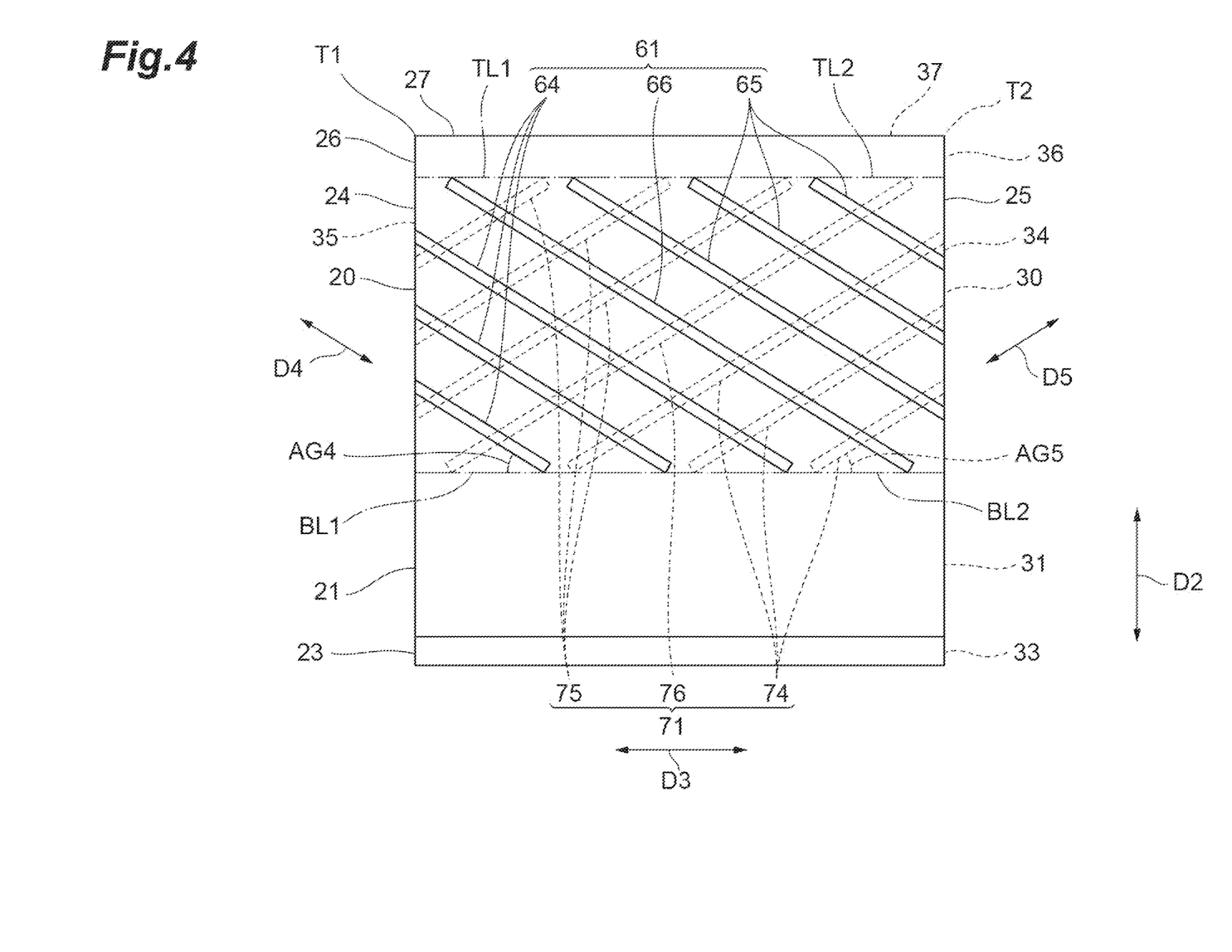
FIG. 4 is a view illustrating a configuration of the metal terminal according to the first embodiment, when viewed in a first direction.

A configuration of an electronic component according to a first embodiment will be described with reference to FIGS. 1 to 4. FIG. 1 is a perspective view of the electronic component according to the first embodiment. FIG. 2 is a view illustrating a cross-sectional configuration of the electronic component according to the first embodiment. FIG. 3 is a view illustrating a cross-sectional configuration of a metal terminal, solder, and an external electrode according to the first embodiment. In FIG. 3, hatching lines representing a cross section are omitted. FIG. 4 is a view illustrating a configuration of the metal terminal according to the first embodiment, when viewed in a first direction.

As illustrated in FIGS. 1 and 2, an electronic component 1 includes a multilayer capacitor LC1 and a pair of metal terminals T1 and T2. The multilayer capacitor LC1 includes an element body 10 and a pair of external electrodes 11 and 12. The element body 10 has a rectangular parallelepiped shape. Examples of the rectangular parallelepiped shape include a rectangular parallelepiped shape whose corners and ridges are chamfered, and a rectangular parallelepiped shape whose corners and ridges are rounded. The external electrodes 11 and 12 are respectively disposed at both ends of the element body 10 in a first direction D1. The metal terminal T1 is connected to the external electrode 11 with solder 2. The metal terminal T2 is connected to the external electrode 12 with solder 3.

The element body 10 includes a pair of principal surfaces 10a and 10b, a pair of end surfaces 10c and 10d, and a pair of side surfaces 10e and 10f. The principal surfaces 10a and 10b, the end surfaces 10c and 10d, and the side surfaces 10e and 10f form the outer surface of the element body 10. The end surfaces 10c and 10d oppose each other in the first direction D1. The principal surfaces 10a and 10b oppose each other in a second direction D2. The side surfaces 10e and 10f oppose each other in a third direction D3. The third direction D3 intersects with the first direction D1 and the second direction D2. In the present embodiment, the first direction D1, the second direction D2, and the third direction D3 are orthogonal to each other. A length of the element body 10 in the first direction D1 is, for example, about 5.7 mm A length of the element body 10 in the second direction D2 is, for example, about 2.0 mm. A length of the element body 10 in the third direction D3 is, for example, about 5.0 mm.

In the element body 10, a plurality of dielectric layers is laminated in the second direction D2. The second direction D2 intersects with the first direction D1. Each dielectric layer includes, for example, a sintered body of a ceramic green sheet containing a dielectric material. The dielectric material is, for example, a $BaTiO_3$-based, Ba (Ti, Zr) $O_3$-based, (Ba, Ca) $TiO_3$-based, $CaZrO_3$-based, or (Ca, Sr) $ZrO_3$-based dielectric ceramics. In an actual element body 10, each of the dielectric layers is integrated to such an extent that a boundary between the dielectric layers cannot be visually recognized.

The multilayer capacitor LC1 includes a plurality of internal electrodes 13 and 14. Each of the internal electrodes 13 and 14 is made of a conductive material. The conductive material is, for example, Ni, Ag, Pd, Ag—Pd, or Cu. A sintered body of a conductive paste containing the conductive material is included in the internal electrodes 13 and 14. The internal electrodes 13 and 14 are arranged in such a manner that polarities of the internal electrodes 13 and 14 are different from each other. The internal electrode 13 and the internal electrode 14 are disposed in different positions (layers) in the second direction D2. In the element body 10, the internal electrodes 13 and the internal electrodes 14 are alternately disposed to oppose each other with an interval in the second direction D2.

In the present embodiment, both of the internal electrode 13 and the internal electrode 14 have a rectangular shape when viewed in the second direction D2, having long sides in the first direction D1 and short sides in the third direction D3. The internal electrode 13 is exposed at the end surface 10c and separated from the end surface 10d. The internal electrode 13 is also separated from the principal surfaces 10a and 10b and the side surfaces 10e and 10f. The internal electrode 14 is exposed at the end surface 10d and separated from the end surface 10c. The internal electrode 14 is also separated from the principal surfaces 10a and 10b and the side surfaces 10e and 10f.

The external electrode 11 covers the end surface 10c. The external electrode 11 is connected to the internal electrode 13 exposed at the end surface 10c. The external electrode 11 is also disposed on parts of the principal surfaces 10a and 10b and parts of the side surfaces 10e and 10f. The external electrode 11 covers the end surface 10c, corners defined by four surfaces, that is, the principal surfaces 10a and 10b and side surfaces 10e and 10f, and ridges coupling the corners.

The external electrode 12 covers the end surface 10d. The external electrode 12 is connected to the internal electrode 14 exposed at the end surface 10d. The external electrode 12 is also disposed on parts of the principal surfaces 10a and 10b and parts of the side surfaces 10e and 10f. The external electrode 12 covers the end surface 10d, corners defined by four surfaces, that is, the principal surfaces 10a and 10b and side surfaces 10e and 10f, and ridges coupling the corners.

The external electrodes 11 and 12 include a sintered conductor layer. The sintered conductive layer is formed of, for example, a conductive paste applied to an outer surface of the element body 10 and sintered. The conductive paste contains conductive metal powder and glass frit. The conductive paste is, for example, a mixture of the metal powder, a glass component, an organic binder, and an organic solvent. The external electrodes 11 and 12 include a plated layer formed on the sintered conductor layer. In the present embodiment, a Ni plated layer and a Sn plated layer are formed in this order on the sintered conductor layer. The metal powder is Cu powder.

The metal terminal T1 includes a connection 20 and a leg 21. The connection 20 is connected to the external electrode 11 with the solder 2 and opposes the external electrode 11 in the first direction D1. The connection 20 has a rectangular shape when viewed in the first direction D1 and extends in the second direction D2 and the third direction D3. The leg 21 extends from the connection 20. In the present embodiment, the leg 21 extends from the connection 20 in the second direction D2.

The leg 21 includes a first portion 22 and a second portion 23. The first portion 22 extends in the second direction D2 to couple one end of the connection 20 and one end of the second portion 23. The first portion 22 and the connection 20 are monolithic and flush with each other. The integrated connection 20 and first portion 22 have a rectangular shape when viewed in the first direction D1. The second portion 23 extends in the first direction D1 from one end of the first portion 22. In the present embodiment, the second portion 23 extends in a direction perpendicular to the first portion 22. The second portion 23 has a rectangular shape when viewed in the second direction D2. The connection 20 and the second portion 23 are separated from each other by a length of the first portion 22 when viewed in the first direction D1. The connection 20, the first portion 22, and the second portion 23 are integrally formed. The second portion 23 is connected to an electronic device ED1 with solder 4. The second portion 23 functions as a mounting region connected to the electronic device ED1. In the present embodiment, the electronic device ED1 includes a circuit board or another electronic component.

The metal terminal T2 includes a connection 30 and a leg 31. The connection 30 is connected to the external electrode 12 with the solder 3 and opposes the external electrode 12 in the first direction D1. The connection 30 has a rectangular shape when viewed in the first direction D1 and extends in the second direction D2 and the third direction D3. The leg 31 extends from the connection 30. In the present embodiment, the leg 31 extends from the connection 30 in the second direction D2.

The leg 31 includes a first portion 32 and a second portion 33. The first portion 32 extends in the second direction D2 to couple one end of the connection 30 and one end of the second portion 33. The first portion 32 and the connection 30 are monolithic and flush with each other. The integrated connection 30 and first portion 32 have a rectangular shape when viewed in the first direction D1. The second portion 33 extends in the first direction D1 from one end of the first portion 32. In the present embodiment, the second portion 33 extends in a direction perpendicular to the first portion 32. The second portion 33 has a rectangular shape when viewed in the second direction D2. The connection 30 and the second portion 33 are separated from each other by a length of the first portion 32 when viewed in the first direction D1. The connection 30, the first portion 32, and the second portion 33 are integrally formed. The second portion 33 is connected to the electronic device ED1 with solder 5. The second portion 33 functions as a mounting region connected to the electronic device ED 1. The second portion 33 is substantially coplanar with the second portion 23 of the metal terminal T1.

The metal terminal T1 includes a base 7. The base 7 includes a first surface 40 and a second surface 41 opposing each other. In the connection 20, the first surface 40 is closer to the multilayer capacitor LC1 than the second surface 41. The first surface 40 and the second surface 41 extend from the connection 20 to the leg 21. The metal terminal T1 includes a plated layer 60. The plated layer 60 is disposed on the first surface 40 of the connection 20. The plated layer 60 may be disposed on the first surface 40 of the leg 21 or may be disposed on the second surface 41 of the connection 20 and the leg 21. In the present embodiment, the plated layer 60 is disposed on the entire surface of the base 7.

The metal terminal T2 includes a base 8. The base 8 includes a first surface 50 and a second surface 51 opposing each other. In the connection 30, the first surface 50 is closer to the multilayer capacitor LC1 than the second surface 51. The first surface 50 and the second surface 51 extend from the connection 30 to the leg 31. The metal terminal T2 includes a plated layer 70. The plated layer 70 is disposed on the first surface 50 of the connection 30. The plated layer 70 may be disposed on the first surface 50 of the leg 31 or may be disposed on the second surface 51 of the connection 30 and the leg 31. In the present embodiment, the plated layer 70 is disposed on the entire surface of the base 8.

The plated layers 60 and 70 include a plurality of layers. For example, the plated layer 60 includes a first layer 60b and a second layer 60c disposed on the first layer 60b. In the present embodiment, the first layer 60b includes the Ni layer, and the second layer 60c includes a Sn layer. In the plated layer 60, for example, the Ni layer and a $Ni_3Sn_4$ layer are located under the Sn layer. In the present embodiment, in a case where the plated layer 60 includes a plurality of layers, an outermost layer of the plurality of layers in the plated layer 60 includes the Sn layer. The plated layer 70 may have the same configuration as the plated layer 60. The plated layers 60 and 70 may include a single layer. The plated layers 60 and 70 are formed, for example, through a plating method. Examples of the plating include sputtering, vapor deposition, and electrolytic plating. The plated layers 60 and 70 have a thickness of, for example, about 5 μm.

The bases 7 and 8 are made of a metal material. Examples of the metal material of the bases 7 and 8 include phosphor bronze, stainless steel, and a Ni—Fe alloy. For example, the Ni—Fe alloy is made of 42 alloy. In the present embodiment, the metal material is made of phosphor bronze. The metal terminals T1 and T2 have a thickness of, for example, 60 μm to 300 μm, including a thickness of the plated layers 60 and 70, respectively.

In the metal terminal T1, the plated layer 60 of the connection 20 is connected to the solder 2, and the connection 20 is connected to the external electrode 11. In the metal terminal T2, the plated layer 70 of the connection 30 is connected to the solder 3, and the connection 30 is connected to the external electrode 12. In the present embodiment, the solder 2 and the solder 3 are made of a Sn—Sb-based solder.

The connection 20 and the external electrode 11 are connected to each other and the connection 30 and the external electrode 12 are connected to each other through, for example, reflow soldering. In the present embodiment, the Sn—Sb-based solder paste is applied with a dispenser to predetermined positions on the surfaces where the connection 20 or 30 and the external electrode 11 or 12 are connected to each other. The solder paste contains Sn, Sb, and a flux. The solder paste may contain a solvent. An example of the flux includes rosin. After applying the solder paste, the multilayer capacitor LC1 and the metal terminals T1 and T2 are heated to melt the Sn—Sb-based solder contained in the solder paste. The molten solder paste is cooled, and then, solidified. This forms the solder 2 and connects the connection 20 and the external electrode 11. Also, this forms the solder 3 and connects the connection 30 and the external electrode 12.

In the metal terminal T1, the plated layer 60 of the second portion 23 is connected to the solder 4, and the leg 21 is connected to the electronic device ED1. In the metal terminal T2, the plated layer 70 of the second portion 33 is connected to the solder 5, and the leg 31 is connected to the electronic device ED1. In the present embodiment, the solder 4 and the solder 5 are made of a Sn—Ag—Cu-based solder.

The legs 21 and 31 are connected to the electronic device ED1 through, for example, reflow soldering. In the present embodiment, the Sn—Ag—Cu-based solder paste is applied through printing to predetermined positions on surfaces to be connected together. The solder paste contains Sn, Cu, Ag, and a flux. The solder paste may contain a solvent. An example of the flux includes rosin. After applying the solder paste, the multilayer capacitor LC1 and the metal terminals T1 and T2 are heated to melt the Sn—Ag—Cu-based solder contained in the solder paste. The molten solder paste is cooled, and then, solidified. Accordingly, the solder 4 is formed, and the leg 21 is connected to the electronic device ED1. The solder 5 is formed, and the leg 31 is connected to the electronic device ED1.

As illustrated in FIG. 3, a plurality of grooves 61 is formed in the connection 20 of the metal terminal T1. In the present embodiment, the grooves 61 are formed through grooving the base 7. The grooving is, for example, done by use of an end mill, a groove milling cutter, a cutting tool, or a laser. The plated layer 60 is formed on the first surface 40 of the base 7 after the grooving. An outer surface 60a of the plated layer 60 includes a surface 62 defining each groove 61 and a plane 63 other than the surface 62. The surface 62 includes an inclined surface 62a and a bottom 62b of each groove 61.

When connecting the connection 20 and the external electrode 11, the solder 2 enters the grooves 61 and the surface 62 is in contact with the solder 2. The plane 63 is also in contact with the solder 2.

In the present embodiment, the surface 62 and the plane 63 are in contact with the solder 2. The solder 2 enters a recess 15 on an outer surface 11a of the external electrode 11. The recess 15 is in contact with the solder 2. A protrusion 16 is also in contact with the solder 2. In the present embodiment, the recess 15 and the protrusion 16 are in contact with the solder 2. The recess 15 and the protrusion 16 are formed when the conductive paste is sintered to prepare the external electrode 11. The recess 15 and the protrusion 16 increase a contact area between the solder 2 and the outer surface 11a of the external electrode 11. FIG. 3 illustrates an enlarged view of the recess 15 and the protrusion 16.

The plurality of grooves 61 includes an interval S61 in the second direction D2. The interval S61 is, for example, 200 μm to 1000 μm. An opening of each grooves 61 has a width W61 of, for example, 20 μm to 100 μm. Each groove 61 has a depth D61 of, for example, 10 μm to 50 μm. The depth D61 is a distance from the plane 63 to the bottom 62b in the first direction D1. The inclined surface 62a of the surface 62 intersects with the plane 63 at an angle AG61. The angle AG61 is, for example, between 40 and 90 degrees. In the present embodiment, the plane 63 extends in the second direction D2. FIG. 3 illustrates the grooves 61 having a trapezoidal cross-sectional shape.

Besides the trapezoidal shape, the grooves 61 may have, for example, a rectangular cross-sectional shape.

As illustrated in FIG. 4, the plurality of grooves 61 is formed in the connection 20 of the metal terminal T1. In the connection 30 of the metal terminal T2, a plurality of grooves 71 is formed. The grooves 71 are formed through grooving the base 8 with, for example, an end mill, a groove milling cutter, a cutting tool, or a laser. The plated layer 70 is formed on the first surface 50 of the base 8 after the grooving. Similarly to the metal terminal T1, an outer surface of the plated layer 70 includes a surface defining each groove 71 and a plane other than the surface defining each groove 71. The surface defining each groove 71 includes an inclined surface and a bottom. When connecting the connection 30 and the external electrode 12, the solder 3 enters the grooves 71, and the surface defining each groove 71 is in contact with the solder 3. The surface defining each groove 71 and the plane other than the surface defining each groove 71 are in contact with the solder 3. The solder 3 enters a recess on an outer surface of the external electrode 12. The recess and a protrusion of the external electrode 12 are in contact with the solder 3.

In FIG. 4, the metal terminals T1 and T2 are illustrated superimposed on each other. The solder 2, the solder 3, and the multilayer capacitor LC1 are not illustrated. The plurality of grooves 61 of the metal terminal T1 are illustrated with solid lines, and the second portion 23 of the metal terminal T1 is also illustrated with solid lines. The plurality of grooves 71 of the metal terminal T2 are illustrated with dashed lines.

In the metal terminal T1, the connection 20 includes a pair of end edges 24 and 25 separated from each other in the third direction D3. The edges 24 and 25 extend in the second direction D2 from the connection 20 to the leg 21. The plurality of grooves 61 extends in such a manner that the grooves 61 are separated from one of the pair of end edges 24 and 25. Grooves 64 of the plurality of grooves 61 reach one of the pair of end edges 24 and 25 and are separated from the other of the pair of end edges 24 and 25. In the present embodiment, the grooves 64 reach the end edge 24 and are separated from the end edge 25. Grooves 65 of the plurality of grooves 61 are separated from one of the pair of end edges 24 and 25 and reach the other of the pair of end edges 24 and 25. In the present embodiment, the grooves 65 are separated from the end edge 24 and reach the end edge 25. The plurality of grooves 61 may include grooves 66. The grooves 66 are separated from both of the pair of end edges 24 and 25. In FIG. 4, one groove 66 is separated from both of the pair of end edges 24 and 25.

The plurality of grooves 61 is not formed in the leg 21. The plurality of grooves 61 is not formed in an upper region 26 of the connection 20. The upper region 26 includes an upper end edge 27 of the connection 20. The upper region 26 has a predetermined width from the upper end edge 27 in the second direction D2. The plurality of grooves 61 extends in such a manner that the grooves 61 are separated from the upper end edge 27 in the second direction D2. The plurality of grooves 61 is formed in a region between a top line TL1 and a bottom line BL1 in the second direction D2.

The plurality of grooves 61 extends in a fourth direction D4. The fourth direction D4 is different from the second direction D2 and intersects with the third direction D3. An angle AG4 between the fourth direction D4 and the third direction D3 is, for example, 10 to 60 degrees. In the present embodiment, the grooves 64, 65, and 66 extend in the fourth direction D4.

In the metal terminal T2, the connection 30 includes a pair of end edges 34 and 35 separated from each other in the third direction D3. The end edges 34 and 35 extend in the second direction D2 from the connection 30 to the leg 31. The plurality of grooves 71 extends in such a manner that the grooves 71 are separated from one of the pair of end edges 34 and 35. Grooves 74 of the plurality of grooves 71 reach one of the pair of end edges 34 and 35 and are separated from the other of the pair of end edges 34 and 35. In the present embodiment, the grooves 74 reach the end edge 34 and are separated from the end edge 35. Grooves 75 of the plurality of grooves 71 are separated from one of the pair of end edges 34 and 35 and reach the other of the pair of end edges 34 and 35. In the present embodiment, the grooves 75 are separated from the end edge 34 and reach the end edge 35. The plurality of grooves 71 may further include grooves 76. The groove 76 are separated from both of the pair of end edges 34 and 35. In FIG. 4, one groove 76 is separated from both of the pair of end edges 34 and 35.

The plurality of grooves 71 is not formed in the leg 31. The plurality of grooves 71 is not formed in an upper region 36 of the connection 30. The upper region 36 includes an upper end edge 37 of the connection 30. The upper region 36 has a predetermined width from the upper end edge 37 in the second direction D2. The plurality of grooves 71 extends in such a manner that the grooves 71 are separated from the upper end edge 37 in the second direction D2. The plurality of grooves 71 is formed in a region between a top line TL2 and a bottom line BL2 in the second direction D2.

The plurality of grooves 71 extends in a fifth direction D5. The fifth direction D5 is different from the second direction D2 and intersects with the third direction D3. An angle AG5 between the fifth direction D5 and the third direction D3 is, for example, 10 to 60 degrees. In the present embodiment, the grooves 74, 75, and 76 extend in the fifth direction D5.

In the present embodiment, when viewed in the first direction D1, the plurality of grooves 61 formed in the connection 20 of the metal terminal T1 of the pair of metal terminals T1 and T2 extends in a direction intersecting with a direction in which the plurality of grooves 71 formed in the connection 30 of the metal terminal T2 of the pair of metal terminals T1 and T2 extends. Therefore, the fourth direction D4 intersects with the fifth direction D5.

As described above, in the present embodiment, the electronic component 1 includes the element body 10, the pair of external electrodes 11 and 12 respectively disposed at both ends of the element body 10 in the first direction D1, and the pair of metal terminals T1 and T2 connected to the pair of external electrodes 11 and 12 with the solder 2 and the solder 3, respectively. The metal terminals T1 and T2 include the connections 20 and 30 opposing the external electrodes 11 and 12 in the first direction D1 and formed with the plurality of grooves 61 and 71, and include the legs 21 and 31 extending from the connections 20 and 30, respectively.

The connection 20 includes the pair of end edges 24 and 25 separated from each other in the third direction D3 intersecting with the second direction D2 in which the leg 21 extends from the connection 20. The plurality of grooves 61 extends in a direction different from the second direction D2 and intersecting with the third direction D3 in such a manner that the grooves 61 are separated from one of the pair of end edges 24 and 25. The surface 62 included in the connection 20 and defining each of the grooves 61 is in contact with the solder 2. The connection 30 includes the pair of end edges 34 and 35 separated from each other in the third direction D3 intersecting with the second direction D2 in which the leg 31 extends from the connection 30. The plurality of grooves 71 extends in a direction different from the second direction D2 and intersecting with the third direction D3 in such a manner that the grooves 71 are separated from one of the pair of end edges 34 and 35. The surface included in the connection 30 and defining each of the grooves 71 is in contact with the solder 3.

In the electronic component 1, the plurality of grooves 61 and the plurality of grooves 71 are respectively formed in the connections 20 and 30, and the surface 62 defining each groove 61 and the surface defining each groove 71 are respectively in contact with the solder 2 and the solder 3. Such a configuration increases a contact area between the solder 2 and the connection 20 and a contact area between the solder 3 and the connection 30. A configuration in which the grooves 61 and 71 extend in directions different from the second direction D2 prevents from drooping along the grooves 61 and 71 as compared with a configuration in which the grooves 61 and 71 extend in the second direction D2, when the external electrodes 11 and 12 and the metal terminals T1 and T2 are connected with the solder 2 and the solder 3. The electronic component 1 enhances connection strength between the external electrode 11 and the metal terminal T1 and between the external electrode 12 and the metal terminal T2. A configuration in which the plurality of grooves 61 formed is separated from one of the pair of end edges 24 and 25 separated from each other in the third direction D3 does not couple the pair of end edges 24 and 25 via the grooves 61. A configuration in which the plurality of grooves 71 formed is separated from one of the pair of end edges 34 and 35 separated from each other in the third direction D3 does not couple the pair of end edges 34 and 35 via the grooves 71. The extending directions of the grooves 61 and 71 intersect with the third direction D3. The electronic component 1 prevents the metal terminals T1 and T2 from decreasing in strength.

In the electronic component 1, grooves 64 of the plurality of grooves 61 reach an end edge 24 of the pair of end edges 24 and 25 and are separated from the end edge 25 of the pair of end edges 24 and 25. Grooves 75 of the plurality of grooves 71 reaches an end edge 35 of the pair of end edges 34 and 35 and is separated from the end edge 34 of the pair of end edges 34 and 35. In this case, the grooves 64 and 75 extend to the end edges 24 and 35, and a contact area is increased between the solder 2 and the connection 20 at the end edge 24 and the contact area between the solder 3 and the connection 30 at the end edge 35. The grooves 64 and 75 is separated from the end edges 25 and 34, and a decrease in strength is prevented in the metal terminals T1 and T2.

In the electronic component 1, the grooves 65 and 74 of the plurality of grooves 61 and 71 extend from the end edges 24 and 35 and reach the end edges 25 and 34. In this case, the grooves 65 and 74 extend to the end edges 25 and 34, and a contact area is increased between the solder 2 and the connection 20 at the end edge 24 and the contact area between the solder 3 and the connection 30 at the end edges 25 and 34. The grooves 65 and 74 is separated from the end edges 24 and 35, and a decrease in strength is prevented in the metal terminals T1 and T2.

In the electronic component 1, when viewed in the first direction D1, the plurality of grooves 61 formed in the connection 20 of the metal terminal T1 of the pair of metal terminals T1 and T2 extends in a direction intersecting with a direction in which the plurality of grooves 71 formed in the connection 30 of the metal terminal T2 of the pair of metal terminals T1 and T2 extends. In this case, when an external force is applied to the pair of metal terminals T1 and T2, the pair of metal terminals T1 and T2 tends not to bend. The configuration reliably prevents the metal terminals T1 and T2 from decreasing in strength.

In the electronic component 1, the plurality of grooves 61 and the plurality of grooves 71 are not formed in the legs 21 and 31. In this case, the legs 21 and 31 tend not to decrease in strength. The configuration even more reliably prevents the metal terminals T1 and T2 from decreasing in strength.

In the electronic component 1, the metal terminals T1 and T2 include plated layers 60 and 70 constituting the outermost layers of the connections 20 and 30, and each of the plated layers 60 and 70 include the Ni layer and the Sn layer disposed on the Ni layer. The configuration further increases the connection strength between the solder 2 and the connection 20 and the connection strength between the solder 3 and the connection 30.

In the electronic component 1, the outer surface of the plated layer 60 includes the surface 62 defining each groove 61. The configuration increases the connection strength between the solder 2 and the surface 62 defining each groove 61.

In the present embodiment, the electronic component 1 includes the pair of metal terminals T1 and T2 but may include one of the metal terminals T1 and T2. In a case where the electronic component 1 includes the metal terminal T1, the electronic component 1 includes the element body 10, the external electrode 11 disposed at an end of the element body 10 in the first direction, and the metal terminal T1 connected to the external electrode 11 with the solder 2. The metal terminal T1 includes the connection 20 opposing the external electrode 11 in the first direction D1 and formed with the plurality of grooves 61 and includes the leg 21 extending from the connection 20. The connection 20 includes the pair of end edges 24 and 25 separated from each other in the third direction D3 intersecting with the second direction D2 in which the leg 21 extends from the connection 20. The plurality of grooves 61 extends in a direction different from the second direction D2 and intersects with the third direction D3 in such a manner that the grooves 61 are separated from one of the pair of end edges 24 and 25. The surface 62 included in the connection 20 and defining each of the grooves 61 is in contact with the solder 2.

When the electronic component 1 includes the metal terminal T1, according to the electronic component 1, the configuration in which the plurality of grooves 61 is formed in the connection 20 and the surface 62 defining each groove 61 is in contact with the solder 2 increases a contact area between the solder 2 and the connection 20. The configuration in which the grooves 61 extend in a direction different from the second direction D2 prevents from drooping along the grooves 61 as compared with the configuration in which the grooves 61 extend in the second direction D2, when the external electrode 11 and the metal terminal T1 are connected with the solder 2. The electronic component 1 enhances connection strength between the external electrode 11 and the metal terminal T1. The configuration in which the plurality of grooves 61 formed is separated from one of the pair of end edges 24 and 25 separated from each other in the third direction D3 does not couple the pair of end edges 24 and 25 via the grooves 61. The extending direction of the grooves 61 intersects with the third direction D3. The electronic component 1 prevents the metal terminal T1 from decreasing in strength.

Figure 5:
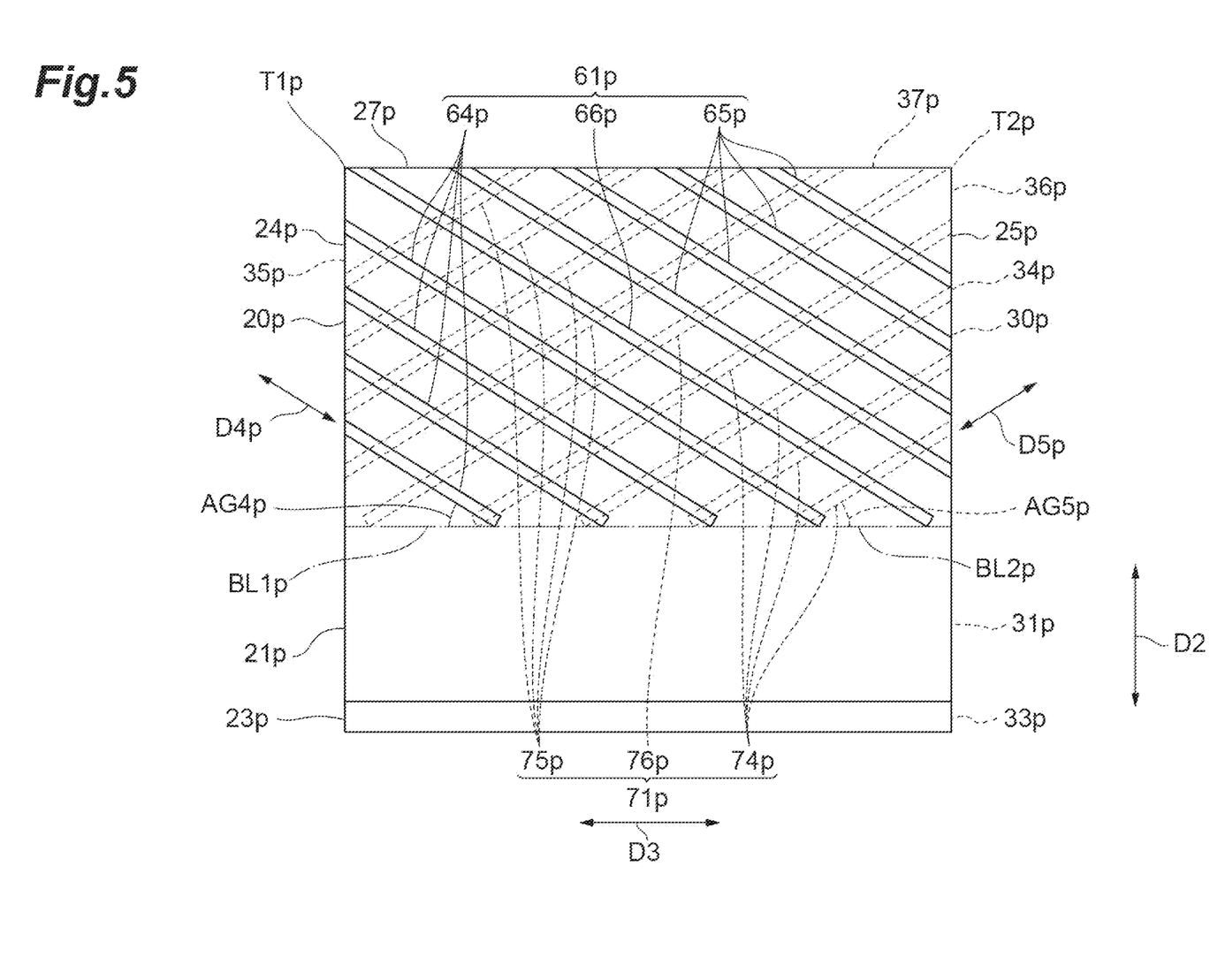
FIG. 5 is a view illustrating a configuration, when viewed in a first direction, of metal terminals according to a modification of the first embodiment.

Next, a configuration of an electronic component according to a modification of the first embodiment will be described with reference to FIG. 5. FIG. 5 is a view illustrating a configuration of metal terminals T1$p$ and T2$p$ according to a modification of the first embodiment, when viewed in a first direction D1. In FIG. 5, the metal terminals T1$p$ and T2$p$ are illustrated superimposed on each other. The present modification is different from the first embodiment in that the electronic component 1 includes metal terminals T1$p$ and T2$p$ instead of the metal terminals T1 and T2. The solder 2, the solder 3, and the multilayer capacitor LC1 are not illustrated. A plurality of grooves 61$p$ is formed in the metal terminal T1$p$, and the plurality of grooves 61$p$ is illustrated with solid lines. A second portion 23$p$ of the metal terminal T1$p$ is also illustrated with solid lines. In the metal terminal T2$p$, a plurality of grooves 71$p$ is formed, and the plurality of grooves 71$p$ is illustrated with dashed lines.

In the metal terminal T1$p$, a connection 20$p$ includes a pair of end edges 24$p$ and 25$p$ separated from each other in the third direction D3. The end edges 24$p$ and 25$p$ extend in the second direction D2 from the connection 20$p$ to a leg 21$p$. The plurality of grooves 61$p$ extends in such a manner that the grooves 61$p$ are separated from one of the pair of end edges 24$p$ and 25$p$. In the present modification, grooves 64$p$ of the plurality of grooves 61$p$ reach the end edge 24$p$ and are separated from the end edge 25$p$. Grooves 65$p$ of the plurality of grooves 61$p$ are separated from the end edge 24$p$ and reach the end edge 25$p$. The plurality of grooves 61$p$ may include grooves 66$p$. The grooves 66$p$ are separated from both of the pair of end edges 24$p$ and 25$p$. In FIG. 5, one groove 66$p$ is separated from both of the pair of end edges 24$p$ and 25$p$.

The plurality of grooves 61$p$ reaches an upper end edge 27$p$ of the connection 20$p$. In the present modification, the grooves 65$p$ and the groove 66$p$ of the plurality of grooves 61p reach the upper end edge 27p. The plurality of grooves 61p is not formed in the leg 21p. The plurality of grooves 61p extends in a fourth direction D4p. The fourth direction D4p is different from the second direction D2 and intersects with the third direction D3. An angle AG4p between the fourth direction D4p and the third direction D3 is, for example, 10 to 60 degrees. In the present modification, the grooves 64p, 65p, and 66p extend in the fourth direction D4p.

In the metal terminal T2p, a connection 30p includes a pair of end edges 34p and 35p separated from each other in the third direction D3. The end edges 34p and 35p extend in the second direction D2 from the connection 30p to a leg 31p. The plurality of grooves 71p extends in such a manner that the grooves 71p are separated from one of the pair of end edges 34p and 35p. In the present modification, grooves 74p of the plurality of grooves 71p reach the end edge 34p and are separated from the end edge 35p. Grooves 75p of the plurality of grooves 71p are separated from the end edge 34p and reach the end edge 35p. The plurality of grooves 71p may include grooves 76p. The grooves 76p are separated from both of the pair of end edges 34p and 35p. In FIG. 5, one groove 76p is separated from both of the pair of end edges 34p and 35p.

The plurality of grooves 71p reaches an upper end edge 37p of the connection 30p. In the present modification, the grooves 75p and the groove 76p of the plurality of grooves 71p reach the upper end edge 37p. The plurality of grooves 71p is not formed in the leg 31p. The plurality of grooves 71p extends in a fifth direction D5p. The fifth direction D5p is different from the second direction D2 and intersects with the third direction D3. An angle AG5p between the fifth direction D5p and the third direction D3 is, for example, 10 to 60 degrees. In the present modification, the grooves 74p, 75p, and 76p extend in the fifth direction D5p.

In the present modification, when viewed in the first direction D1, the plurality of grooves 61p formed in the connection 20p of the metal terminal T1p of the pair of metal terminals T1p and T2p extends in a direction intersecting with a direction in which the plurality of grooves 71p formed in the connection 30p of the metal terminal T2p of the pair of metal terminals T1p and T2p extends. The fourth direction D4p intersects with the fifth direction D5p.

Second Embodiment

Figure 6:
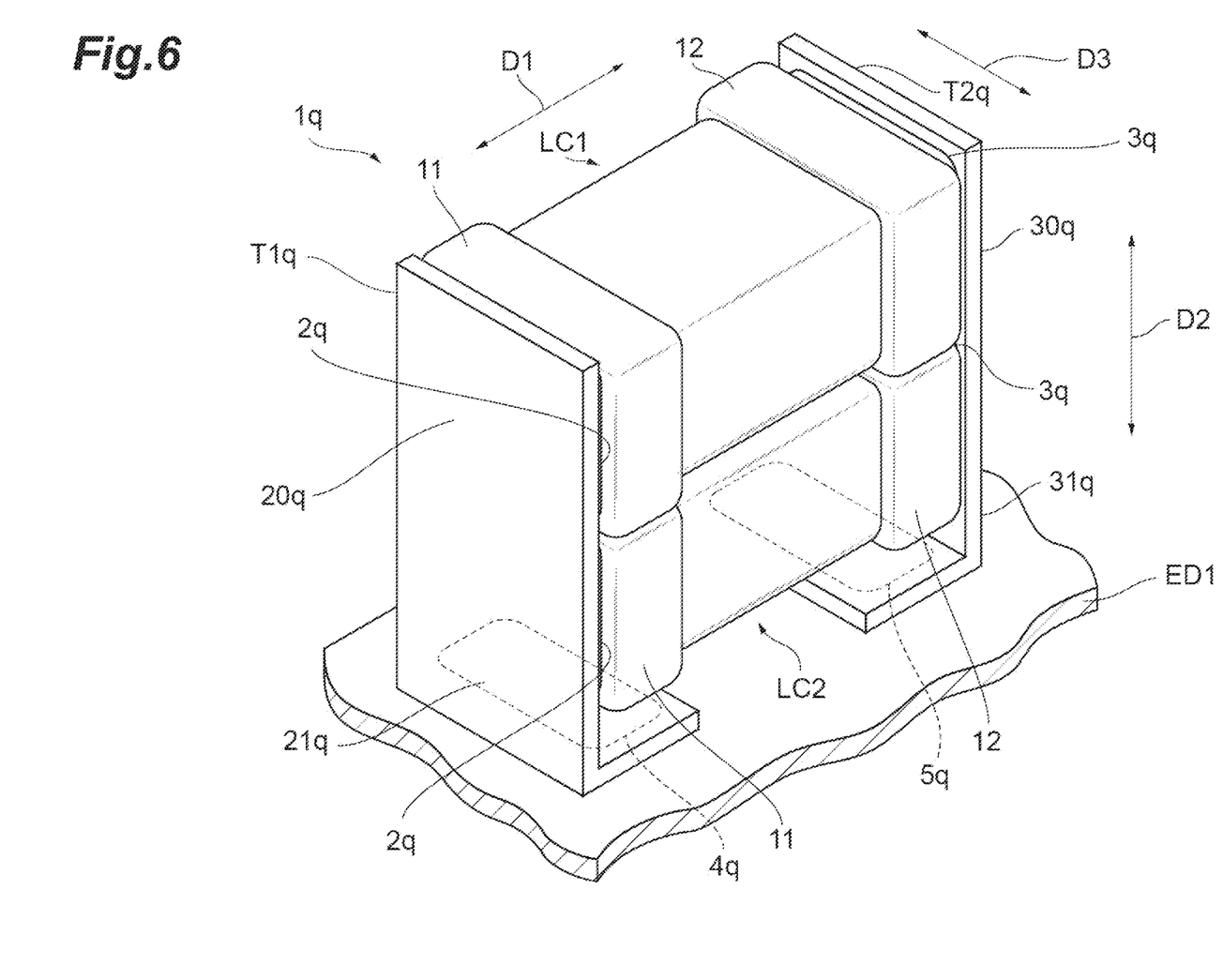
FIG. 6 is a perspective view of an electronic component according to a second embodiment.

Next, a configuration of an electronic component 1q according to a second embodiment will be described with reference to FIG. 6. FIG. 6 is a perspective view of the electronic component 1q according to the second embodiment. In the present embodiment, two multilayer capacitors LC1 and LC2 are disposed side by side in a second direction D2. The multilayer capacitor LC2 has the same configuration and material as the multilayer capacitor LC1.

In a metal terminal T1q, to connect the two multilayer capacitors LC1 and LC2, a connection 20q has a width in the second direction D2 larger than a connection 20 that connects one multilayer capacitor LC1. The connection 20q is connected to the two multilayer capacitors LC1 and LC2 with two solders 2q. A leg 21q of the metal terminal T1q is connected to an electronic device ED1 with solder 4q. In the present embodiment, the solder 2q is the Sn—Sb-based solder, and the solder 4q is the Sn—Ag—Cu-based solder. A base of the metal terminal T1q includes phosphor bronze. The connection 20q includes the outermost layer including a plated layer. The plated layer includes a Ni layer and a Sn layer disposed on the Ni layer. The metal terminal T2q has the same configuration and material as the metal terminal T1q.

Figure 7:
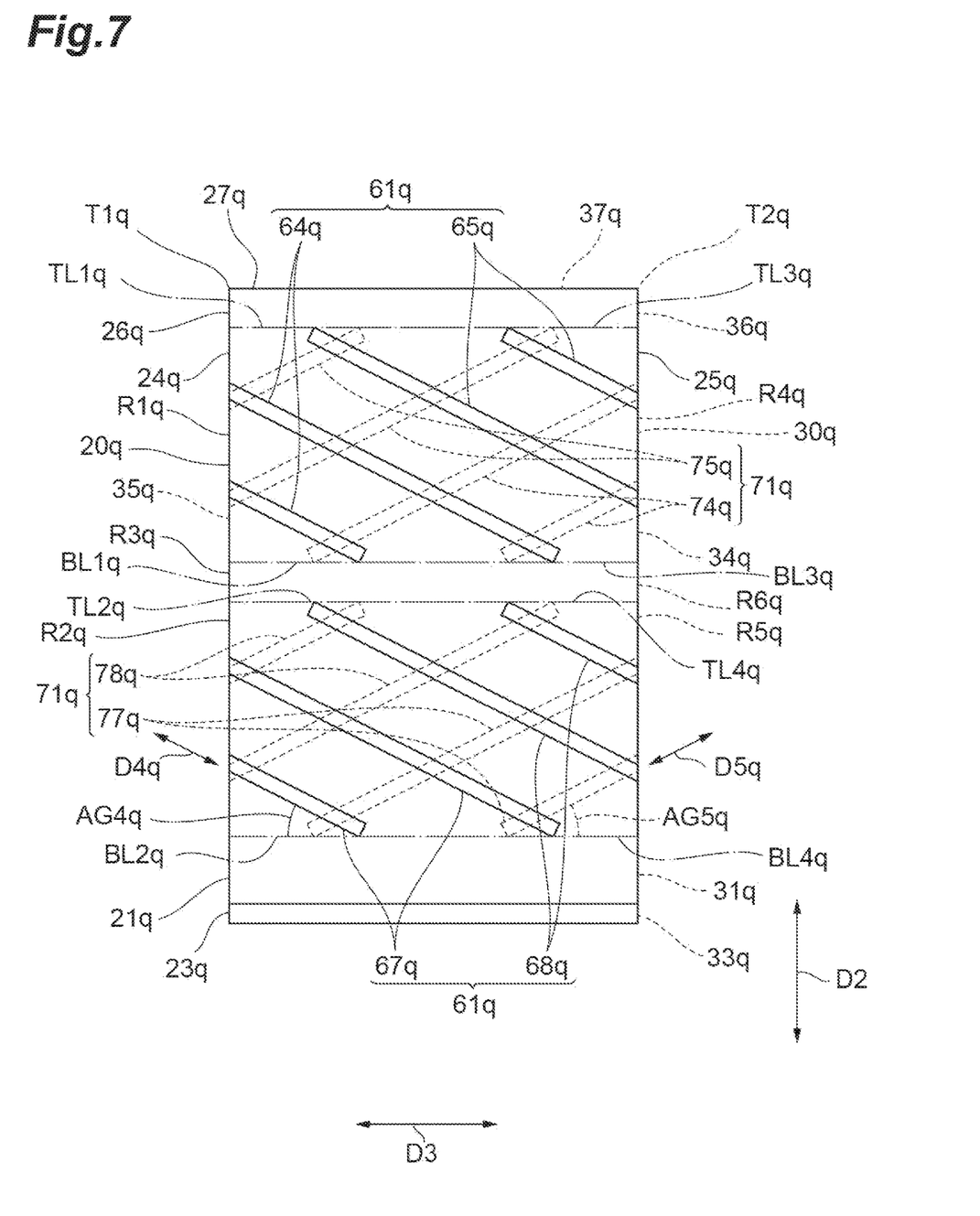
FIG. 7 is a view illustrating a configuration of metal terminals according to the second embodiment, when viewed in a first direction,.

FIG. 7 is a view illustrating a configuration of the metal terminals T1q and T2q according to the second embodiment, when viewed in a first direction D1. In FIG. 7, the metal terminals T1q and T2q are illustrated superimposed on each other. The solder 2q, the solder 4q, and the multilayer capacitors LC1 and LC2 are not illustrated. A plurality of grooves 61q is formed in the metal terminal T1q. The plurality of grooves 61q is illustrated with solid lines. A second portion 23q of the metal terminal T1 is also illustrated with solid lines. In the metal terminal T2q, a plurality of grooves 71q is formed. The plurality of grooves 71q is illustrated with dashed lines.

In the metal terminal T1q, the connection 20q includes a pair of end edges 24q and 25q separated from each other in a third direction D3. The end edges 24q and 25q extend in the second direction D2 from the connection 20q to the leg 21q. The plurality of grooves 61q is formed in two regions of the connection 20q. The two regions are a first region R1q and a second region R2q. The first region R1q is located between a top line TL1q and a bottom line BL1q in the second direction D2. The second region R2q is located between a top line TL2q and a bottom line BL2q in the second direction D2. The first region R1q and the second region R2q are disposed in the second direction D2. The second region R2q is closer to the leg 21q than the first region R1q. The connection 20q includes a third region R3q between the first region R1q and the second region R2q. The plurality of grooves 61q is not formed in the third region R3q. In the present embodiment, the first region R1q, the third region R3q, and the second region R2q are disposed in this order in the second direction D2.

In the first region R1q, the plurality of grooves 61q extends in such a manner that the grooves 61q are separated from one of the pair of end edges 24q and 25q. In the present embodiment, grooves 64q of the plurality of grooves 61q reach the end edge 24q and are separated from the end edge 25q. Grooves 65q are separated from the end edge 24q and reach the end edge 25q. In the second region R2q, the plurality of grooves 61q extends in such a manner that the grooves 61q are separated from one of the pair of end edges 24q and 25q. In the present embodiment, grooves 67q of the plurality of grooves 61q reach the end edge 24q and are separated from the end edge 25q. Grooves 68q are separated from the end edge 24q and reach the end edge 25q.

The plurality of grooves 61q is not formed in the leg 21q. The plurality of grooves 61q is not necessarily formed in an upper region 26q of the connection 20q. The upper region 26q includes an upper end edge 27q of the connection 20q. The plurality of grooves 61q extends in such a manner that the grooves 61q are separated from the upper end edge 27q in the second direction D2.

The plurality of grooves 61q extends in a fourth direction D4q. The fourth direction D4q is different from the second direction D2 and intersects with the third direction D3. An angle AG4q between the fourth direction D4q and the third direction D3 is, for example, 10 to 60 degrees. In the present embodiment, the grooves 64q, 65q, 67q, and 68q extend in the fourth direction D4q.

In the metal terminal T2q, the connection 30q includes a pair of end edges 34q and 35q separated from each other in the third direction D3. The end edges 34q and 35q extend in the second direction D2 from the connection 30q to the leg 31q. The plurality of grooves 71q is formed in two regions of the connection 30q. The two regions are a fourth region R4$q$ and a fifth region R5$q$. The fourth region R4$q$ is located between a top line TL3$q$ and a bottom line BL3$q$ in the second direction D2. The fifth region R5$q$ is located between a top line TL4$q$ and a bottom line BL4$q$ in the second direction D2. The fourth region R4$q$ and the fifth region R5$q$ are disposed in the second direction D2. The fifth region R5$q$ is closer to the leg 31$q$ than the fourth region R4$q$. The connection 30$q$ includes a sixth region R6$q$ between the fourth region R4$q$ and the fifth region R5$q$. The plurality of grooves 71$q$ is not formed in the sixth region R6$q$. In the present embodiment, the fourth region R4$q$, the sixth region R6$q$, and the fifth region R5$q$ are disposed in this order in the second direction D2.

In the fourth region R4$q$, the plurality of grooves 71$q$ extends in such a manner that the grooves 71$q$ are separated from one of the pair of end edges 34$q$ and 35$q$. In the present embodiment, grooves 74$q$ of the plurality of grooves 71$q$ reach the end edge 34$q$ and are separated from the end edge 35$q$. Grooves 75$q$ are separated from the end edge 34$q$ and reach the end edge 35$q$. In the fifth region R5$q$ in the present embodiment, the plurality of grooves 71$q$ extends in such a manner that the grooves 71$q$ are separated from one of the pair of end edges 34$q$ and 35$q$. Grooves 77$q$ of the plurality of grooves 71$q$ reach the end edge 34$q$ and are separated from the end edge 35$q$. Grooves 78$q$ are separated from the end edge 34$q$ and reach the end edge 35$q$.

The plurality of grooves 71$q$ is not formed in the leg 31$q$. The plurality of grooves 71$q$ is not necessarily formed in an upper region 36$q$ of the connection 30$q$. The upper region 36$q$ includes the upper end edge 37$q$ of the connection 30$q$. The plurality of grooves 71$q$ extends in such a manner that the grooves 71$q$ are separated from the upper end edge 37$q$ in the second direction D2. The plurality of grooves 71$q$ extends in a fifth direction D5$q$. The fifth direction D5$q$ is different from the second direction D2 and intersects with the third direction D3. An angle AG5$q$ between the fifth direction D5$q$ and the third direction D3 is, for example, 10 to 60 degrees. In the present embodiment, the grooves 74$q$, 75$q$, 77$q$, and 78$q$ extend in the fifth direction D5$q$.

In the present embodiment, when viewed in the first direction D1, the plurality of grooves 61$q$ formed in the connection 20$q$ of the metal terminal T1$q$ of the pair of metal terminals T1$q$ and T2$q$ extends in a direction intersecting with a direction in which the plurality of grooves 71$q$ formed in the connection 30$q$ of the metal terminal T2$q$ of the pair of metal terminals T1$q$ and T2$q$ extends. The fourth direction D4$q$ intersects with the fifth direction D5$q$.

The metal terminal T1$q$ does not necessarily include the upper region 26$q$ in the connection 20$q$. The grooves 61$q$ may reach the upper end edge 27$p$. The grooves 61$q$ may be formed in the third region R3$q$. When the grooves 61$q$ are formed in the third region R3$q$, for example, the grooves 61$q$ in the first region R1$q$ may be coupled to the grooves 61$q$ in the second region R2$q$ via the grooves 61$q$ in the third region R3$q$. The metal terminal T2$q$ does not necessarily include the upper region 36$q$ in the connection 30$q$. The grooves 71$q$ may reach the upper end edge 37$q$. The grooves 71$q$ may be formed in the sixth region R6$q$. When the grooves 71$q$ are formed in the sixth region R6$q$, for example, the grooves 71$q$ in the fourth region R4$q$ may be coupled to the grooves 71$q$ in the fifth region R5$q$ via the grooves 71$q$ in the sixth region R6$q$.

In the present embodiment, in a configuration where the grooves 61$q$ are formed in the third region R3$q$, an amount of the solder 2$q$ entering the grooves 61$q$ is increased as compared with a configuration where the grooves 61$q$ are not formed in the third region R3$q$. An area of the conductor in the metal terminal T1$q$ is increased, which leads to a reduction in connection resistance between the multilayer capacitors LC1 and LC2. In the configuration where the grooves 61$q$ are not formed in the third region R3$q$, among the solder 2$q$ that enters the first region R1$q$, an amount of the solder 2$q$ drooping to the second region R2$q$ is decreased as compared with the configuration where the grooves 61$q$ are formed in the third region R3$q$. An amount of the solder 2$q$ remaining in the first region R1$q$ is increased, and the increase of the remaining solder 2$q$ prevents a reduction in connection strength between the metal terminal T1$q$ and the multilayer capacitor LC1 disposed above the multilayer capacitor LC2.

In a configuration where the grooves 71$q$ are formed in the sixth region R6$q$, an amount of the solder 3$q$ entering the grooves 71$q$ is increased as compared with a configuration where the grooves 71$q$ are not formed in the sixth region R6$q$. An area of the conductor at the metal terminal T2$q$ is increased, which leads to a reduction in connection resistance between the multilayer capacitors LC1 and LC2. In the configuration where the grooves 71$q$ are not formed in the sixth region R6$q$, among the solder 3$q$ entering the fourth region R4$q$, an amount of the solder 3$q$ drooping to the fifth region R5$q$ is decreased as compared with the configuration where the grooves 71$q$ are formed in the sixth region R6$q$. An amount of the solder 3$q$ remaining in the fourth region R4$q$ is increased, and the increase of the remaining solder 3$q$ prevents a reduction in connection strength between the metal terminal T2$q$ and the multilayer capacitor LC1 disposed above the multilayer capacitor LC2.

Although the embodiments and modification of the present invention have been described above, the present invention is not necessarily limited to the embodiments and modification, and the embodiments and modification can be variously changed without departing from the scope of the invention.

In the embodiments and the modification, the multilayer capacitors such as the multilayer capacitors LC1 and LC2 have been described as examples of components included in an electronic component, but the present invention is not limited to multilayer capacitors. The present invention may be applicable to multilayer electronic components such as multilayer inductors, multilayer varistors, multilayer piezoelectric actuators, multilayer thermistors, or multilayer composite components or may be applicable to components other than these multilayer electronic components.

At least one of the plurality of grooves 61 and 71 may not be formed in the legs 21 and 31. In a configuration in which the plurality of grooves 61 and 71 is not formed in the legs 21 and 31, the legs 21 and 31 do not decrease in strength as described above. The plurality of grooves 61 formed in the connection 20 of the metal terminal T1 of the pair of metal terminals T1 and T2 may not extend in a direction intersecting with a direction in which the plurality of grooves 71 formed in the connection 30 of the metal terminal T2 extends when viewed in the first direction D1. In a configuration in which the plurality of grooves 61 extends in a direction intersecting with a direction in which the plurality of grooves 71 extend when viewed in the first direction D1, the pair of metal terminals T1 and T2 tends not to bend when an external force is applied to the pair of metal terminals T1 and T2 as described above.

What is claimed is:
1. An electronic component comprising:
    an element body;
    a pair of external electrodes respectively disposed at both ends of the element body in a first direction;

a pair of metal terminals respectively connected to the pair of external electrodes with solder, the metal terminals each including:

a connection opposing a corresponding external electrode of the pair of external electrodes in the first direction and formed with a plurality of grooves; and a leg extending from the connection, wherein the connection includes a pair of end edges separated from each other in a third direction intersecting with a second direction in which the leg extends from the connection, the plurality of grooves extends in a direction different from the second direction and intersecting with the third direction in such a manner that the plurality of grooves is separated from one of the pair of end edges, and a surface included in the connection and defining each of the grooves is in contact with the solder.

2. The electronic component according to claim 1, wherein at least one of the plurality of grooves reaches one end edge of the pair of end edges and is separated from another end edge of the pair of end edges.

3. The electronic component according to claim 2, wherein at least another of the plurality of grooves is separated from the one end edge and reaches the other end edge.

4. The electronic component according to claim 1, wherein the plurality of grooves formed in the connection of one metal terminal of the pair of metal terminals extends in a direction intersecting with a direction in which the plurality of grooves formed in the connection of another metal terminal of the pair of metal terminals extends when viewed in the first direction.

5. The electronic component according to claim 1, wherein the plurality of grooves is not formed in the leg.

6. The electronic component according to claim 1, wherein the metal terminal includes a plated layer constituting an outermost layer of the connection, the plated layer including a Ni layer and a Sn layer disposed on the Ni layer.

7. The electronic component according to claim 6, wherein an outer surface of the plated layer includes the surface defining each of the grooves.

8. An electronic component comprising:

an element body;

an external electrode disposed at an end of the element body in a first direction;

a metal terminal connected to the external electrode with solder, the metal terminal including:

a connection opposing the external electrode in the first direction and formed with a plurality of grooves; and a leg extending from the connection, wherein the connection includes a pair of end edges separated from each other in a third direction intersecting with a second direction in which the leg extends from the connection, the plurality of grooves extends in a direction different from the second direction and intersecting with the third direction in such a manner that the plurality of grooves is separated from one of the pair of end edges, and a surface included in the connection and defining each of the grooves is in contact with the solder.

* * * * *